(12) United States Patent
Orbeck et al.

(10) Patent No.: US 8,328,551 B2
(45) Date of Patent: Dec. 11, 2012

(54) CONVECTION FURNACE THERMAL PROFILE ENHANCEMENT

(75) Inventors: Gary Orbeck, Windham, NH (US); Robert Honnors, Pepperell, MA (US); Wayne L. Gibbs, Sandown, NH (US)

(73) Assignee: BTU International, Inc., N. Billerica, MA (US)

( * ) Notice: Subject to any disclaimer, the term of this patent is extended or adjusted under 35 U.S.C. 154(b) by 0 days.

(21) Appl. No.: 10/463,654

(22) Filed: Jun. 17, 2003

(65) Prior Publication Data

US 2004/0063058 A1    Apr. 1, 2004

Related U.S. Application Data

(60) Provisional application No. 60/413,879, filed on Sep. 26, 2002.

(51) Int. Cl.
*F27B 9/02* (2006.01)

(52) U.S. Cl. ............ 432/59; 432/80; 432/128; 432/144; 432/152; 432/176

(58) Field of Classification Search ............ 432/11, 432/59, 77, 78, 80, 121, 128, 144, 152, 176; 34/451, 477, 497, 636, 209, 210, 212; 75/484, 75/757; 266/175–177
See application file for complete search history.

(56) References Cited

U.S. PATENT DOCUMENTS

| | | | |
|---|---|---|---|
| 3,119,166 A | | 1/1964 | Ostermaier ............ 25/135 |
| 3,182,981 A | | 5/1965 | Walker ............ 263/36 |
| 3,244,507 A | * | 4/1966 | Linney ............ 266/175 |
| 3,332,770 A | * | 7/1967 | Wendt, Jr. et al. ............ 75/484 |
| 4,477,718 A | | 10/1984 | Crain et al. ............ 219/388 |
| 4,767,320 A | * | 8/1988 | Sasaki et al. ............ 432/59 |
| 4,938,410 A | * | 7/1990 | Kondo ............ 432/128 |
| 5,069,618 A | * | 12/1991 | Nieberding ............ 432/144 |
| 5,370,531 A | * | 12/1994 | Tsurumi et al. ............ 432/128 |
| 5,567,151 A | * | 10/1996 | Mizoguchi et al. ............ 432/59 |
| 5,573,688 A | | 11/1996 | Chanasyk et al. |
| 5,829,509 A | * | 11/1998 | Crafton ............ 164/5 |
| 6,146,448 A | * | 11/2000 | Shaw et al. ............ 34/73 |
| 6,473,993 B1 | * | 11/2002 | Yagi et al. ............ 432/11 |
| 2001/0055740 A1 | | 12/2001 | Bloom et al. ............ 432/247 |

FOREIGN PATENT DOCUMENTS

| | | |
|---|---|---|
| JP | 7188783 | 7/1995 |
| JP | 10153387 | 6/1998 |
| JP | 2001208475 | 8/2001 |
| WO | WO 9632510 A1 * | 10/1996 |

* cited by examiner

*Primary Examiner* — Jiping Lu

(74) *Attorney, Agent, or Firm* — Weingarten, Schurgin, Gagnebin & Lebovici LLP

(57) ABSTRACT

A multizone convection furnace is provided in which gas from a cooling chamber of the furnace is directed into one or more heat zones of the furnace for the purpose of providing a specified thermal profile. The gas introduced from the cooling chamber into the one or more heat zones is of the same type of gas present in the heat zones, and typically is nitrogen. In a preferred embodiment, the convection furnaces comprises a heating chamber composed of a plurality of adjacent heat zones and a cooling chamber at the exit end of the heating chamber. A conveyer extends through the furnace for movement of a product through the heat zones and cooling chamber of the furnace. The cooling chamber is coupled to one or more of the heat zones such that cooled gas from the cooling chamber can be introduced into selected heat zones. In one version, a cooled gas path is provided to all of the heat zones and cooled gas is introduced into intended zones by opening associated valves. Alternatively, cooled gas paths can be provided to only predetermined zones where cooled gas introduction is desired.

18 Claims, 6 Drawing Sheets

US 8,328,551 B2

CONVECTION FURNACE THERMAL PROFILE ENHANCEMENT

CROSS REFERENCE TO RELATED APPLICATIONS

This application claims priority under 35 U.S.C. §119(e) to provisional patent application Ser. No. 60/413,879 filed Sep. 26, 2002, the disclosure of which is hereby incorporated by reference.

STATEMENT REGARDING FEDERALLY SPONSORED RESEARCH OR DEVELOPMENT

N/A

BACKGROUND OF THE INVENTION

Multizone convection furnaces are employed for a variety of thermal processing applications such as reflow soldering of components on a printed circuit board and sintering of ceramic multilayer circuits or other ceramic objects. Convection furnaces by their nature move very large volumes of gas in a recirculating path within independently thermally controlled zones. It is difficult to prevent the mixing of gas between adjacent zones that are operating at different temperatures. The gas in the higher temperature zone tends to move to the adjacent lower temperature zone causing the temperature in the lower temperature zone to become hotter than intended. As a result, the specified temperature profile is difficult to maintain and requires more critical adjustment in an effort to maintain the intended profile.

BRIEF SUMMARY OF THE INVENTION

In accordance with the present invention, a multizone convection furnace is provided in which gas from a cooling chamber of the furnace is directed into one or more heat zones of the furnace for the purpose of providing a specified thermal profile. The gas introduced from the cooling chamber into the one or more heat zones is of the same type of gas present in the heat zones, and typically is nitrogen. The introduction of cooled gas from the cooling chamber of the furnace to one or more of the heat zones minimizes the tendency of the heat zones to overheat above an intended temperature level and maintains the temperature of the one or more heat zones within an intended thermal specification.

In a preferred embodiment, the convection furnace comprises a heating chamber composed of a plurality of adjacent heat zones and a cooling chamber at the exit end of the heating chamber. A conveyer extends through the furnace for movement of a product through the heat zones and cooling chamber of the furnace. Each of the heat zones includes a heating assembly for providing heated gas to the product. In one embodiment heated gas impinges on both the top and bottom of the product. In an alternative implementation, heated gas is caused to impinge on only the top or bottom of the product. Each of the heating assemblies includes an electrical heater disposed within a plenum, and a blower motor driving an impeller within the plenum which causes flow of heated gas through orifices of an orifice plate from which heated gas impinges onto the product. The assemblies can be of identical or similar construction and can be of modular form to be easily removable for repair or replacement. Each of the heating assemblies is independently controllable to produce an intended thermal profile along the length of the multiple zones of the furnace. The cooling chamber is coupled to one or more of the heat zones such that cooled gas from the cooling chamber can be introduced into selected heat zones. In one version, a cooled gas path is provided to all of the heat zones and cooled gas is introduced into intended zones by opening associated valves. Alternatively, cooled gas paths can be provided to only predetermined zones where cooled gas introduction is desired.

BRIEF DESCRIPTION OF THE SEVERAL VIEWS OF THE DRAWINGS

The invention will be more fully understood from the following detailed description taken in conjunction with the accompanying drawings in which.

DETAILED DESCRIPTION OF THE INVENTION

Figure 1:
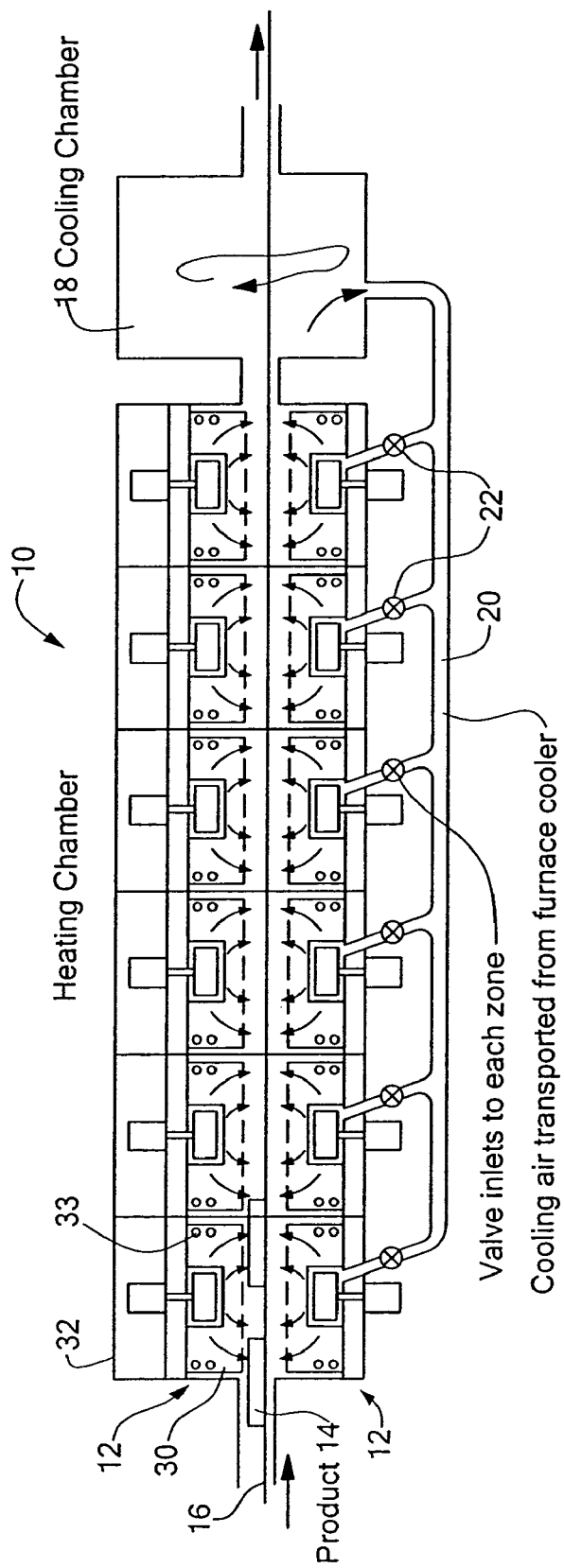
FIG. 1 is a diagrammatic side view of a multizone convection furnace in accordance with the invention.

Referring to FIG. 1 there is shown a multizone convection furnace 10 which, in the illustrated embodiment, has a six zone heating chamber. Each of the zones includes upper and lower heating assemblies 12 for directing heated gas onto a product 14 which is transported through the furnace by a conveyor 16. A cooling chamber 18 is located at the exit end of the heating chamber and through which the conveyer 16 extends for movement of the product from the heat zones through the cooling chamber and thence out of the furnace exit. The cooling chamber 18, which may have one or more separately controllable zones, is coupled to each of the heat zones via piping 20 and valves 22. Each of the valves 22 is disposed within a respective branch of piping 20 connected to a respective zone. The valves can be of a type to open or close the gas path and can be of a type to control the amount of flow in the path. Cooled gas from the cooling chamber 18 can be selectively provided to any one or more of the heat zones by opening of the corresponding valves for the intended zones. The gas is typically nitrogen, which is the same gas as employed in the heat zones of the furnace for convection heating of the product.

Figure 2:
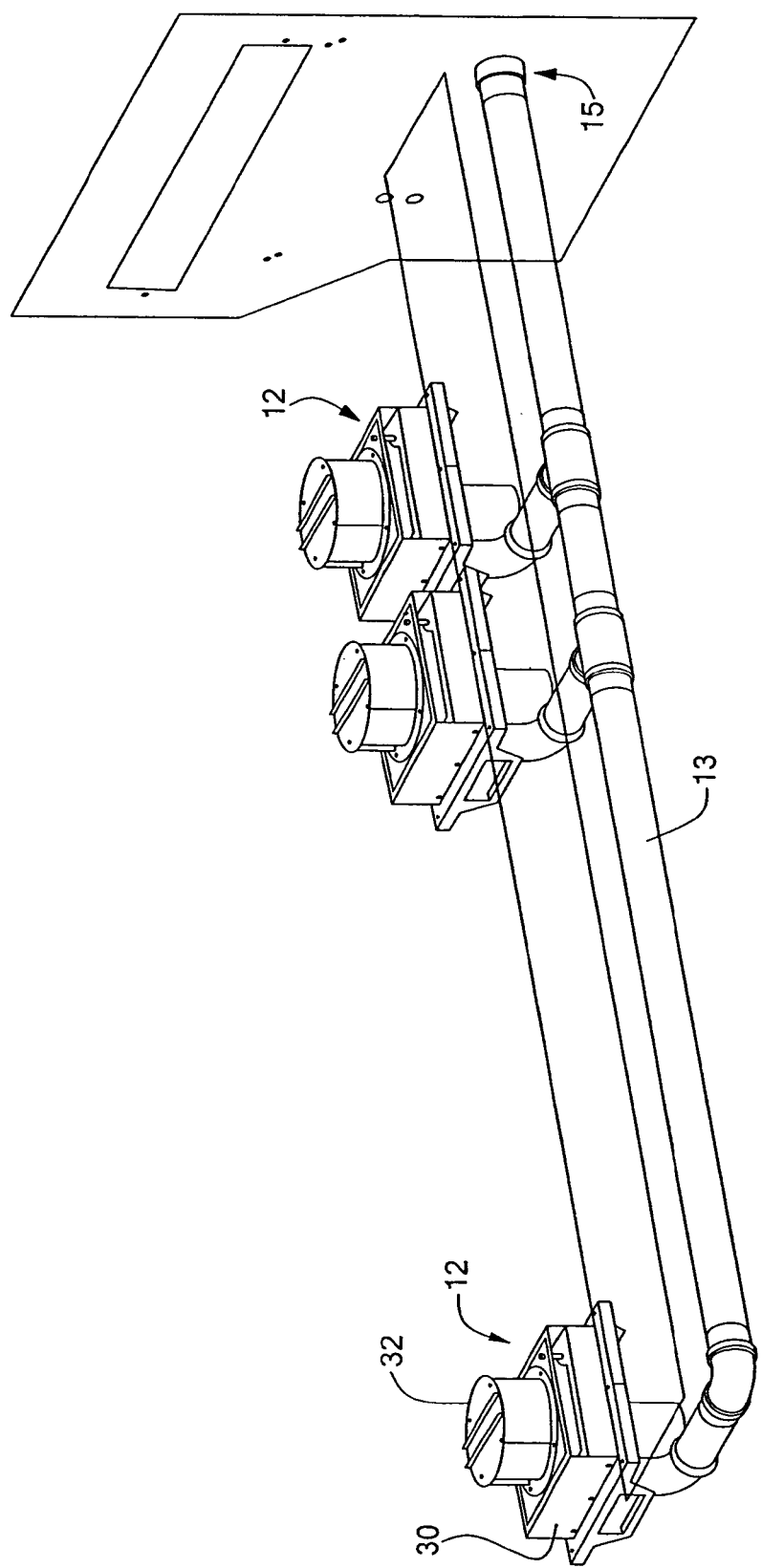
FIG. 2 is a pictorial view of portions of a multizone furnace showing the cooling gas paths.
Figure 3:
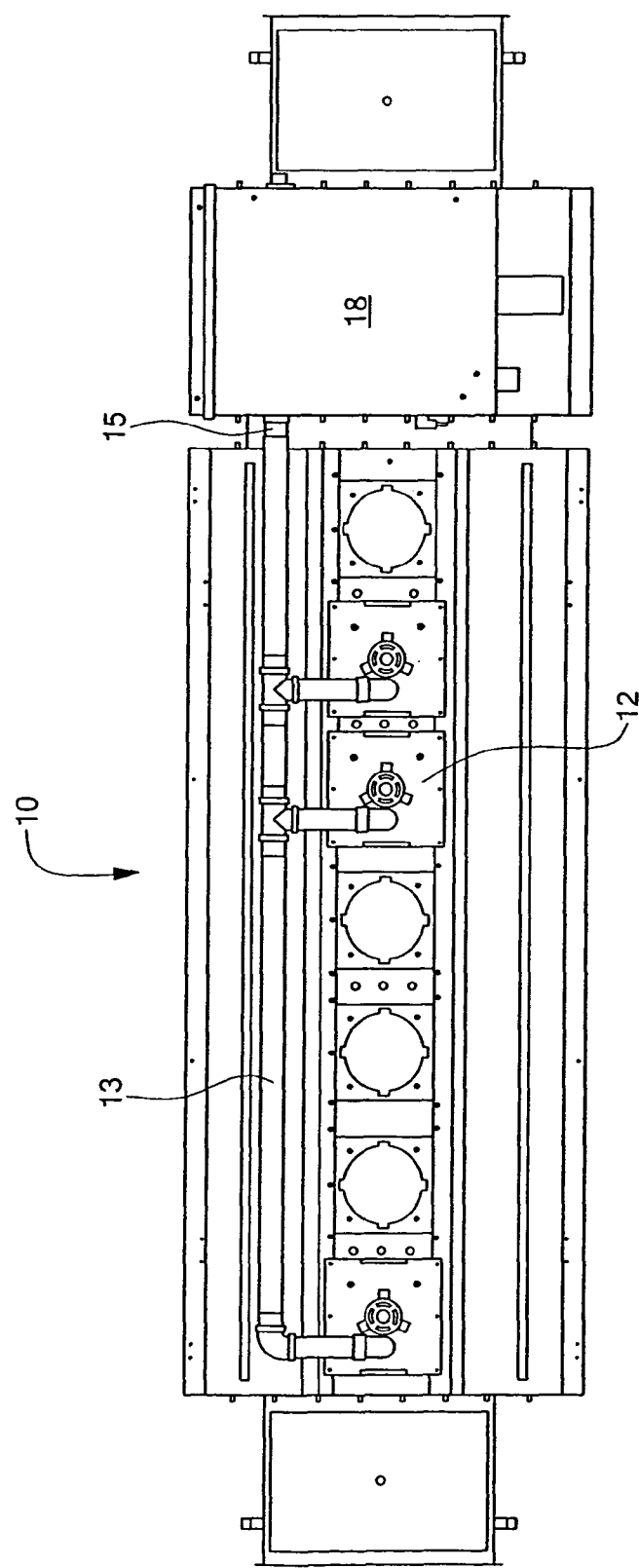
FIG. 3 is a bottom view of a multizone furnace having the cooling gas paths of FIG. 2.

In alternative embodiments, cooled gas paths can be provided to only selected heat zones where cooled gas introduction is desired. No valves are necessary to shut off the gas paths since cooled gas is applied to only predetermined ones of the heat zones. Control valves may be employed to adjust gas flow, as will be described below. Referring to FIG. 2 there is shown the heating assemblies 12 for three zones, each of which is connected to a cooled gas pipe 13 having its inlet 15 coupled to the cooling chamber 18. FIG. 3 shows a bottom view of the multizone furnace and illustrating the three heating assemblies 12 coupled for receipt of cooling gas.

Figure 4:
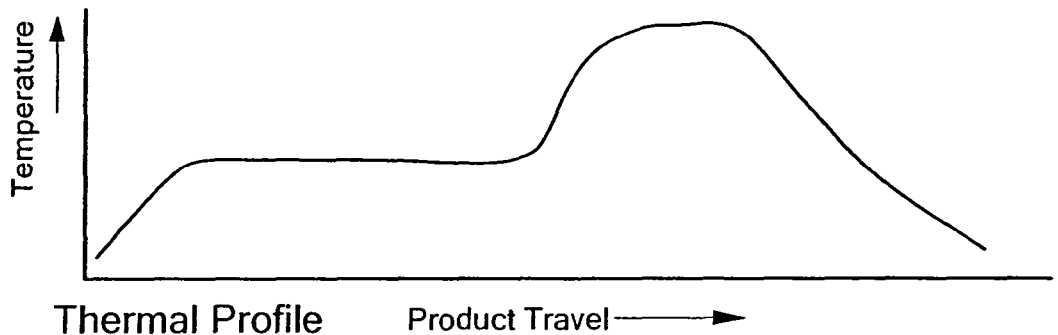
FIG. 4 is a plot of an exemplary thermal profile across the length of the furnace zones.
Figure 5:
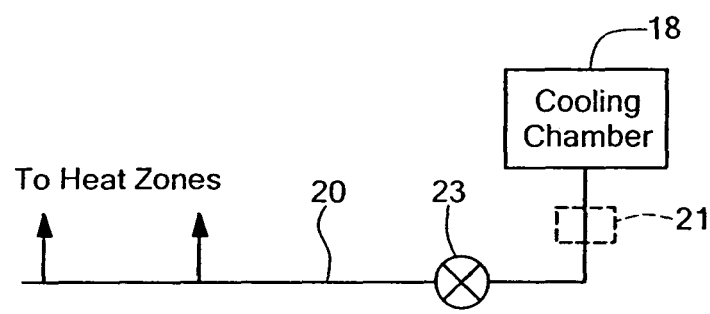
FIG. 5 is a diagrammatic view of the invention showing one valve arrangement.
Figure 6:
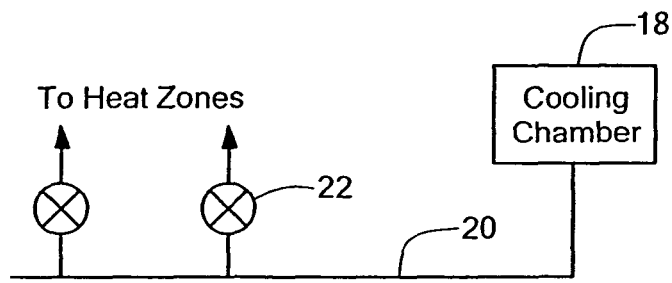
FIG. 6 is a diagrammatic view of the invention showing another valve arrangement.

The cooling gas is introduced into selected zones in sufficient volume to maintain an intended thermal profile. A typical thermal profile is illustrated in FIG. 4. It is evident that the temperature of the product moving through the furnace ramps up during a preheat interval to an intended temperature level, often termed the soak cycle, and is held steady at that temperature level through several zones and thereafter the temperature rises to a higher level, often called the spike cycle, and then decreases as the product travels through the cooling chamber and exits the furnace. As is well known, the temperature profile can be configured to suit the processing requirements for particular products. The volume of the cooling gas provided to the selected heat zones can be determined by the sizing of the piping to provide the intended volume, or alternatively can be determined by control of the flow rate using one or more valves. One valve arrangement is shown in FIG. 5 in which a control valve 23 is provided in piping 20 to control the flow of cooled gas to the selected zones. Another valve arrangement is shown in FIG. 6 wherein a separate control valve 22 is provided in each branch of the piping which leads to respective ones of the selected zones.

The introduction of cooled gas from the cooling chamber of the furnace to one or more of the heat zones minimizes the tendency of the heat zones to overheat above an intended temperature level and maintains the temperature of the one or more heat zones within an intended thermal specification.

Figure 7:
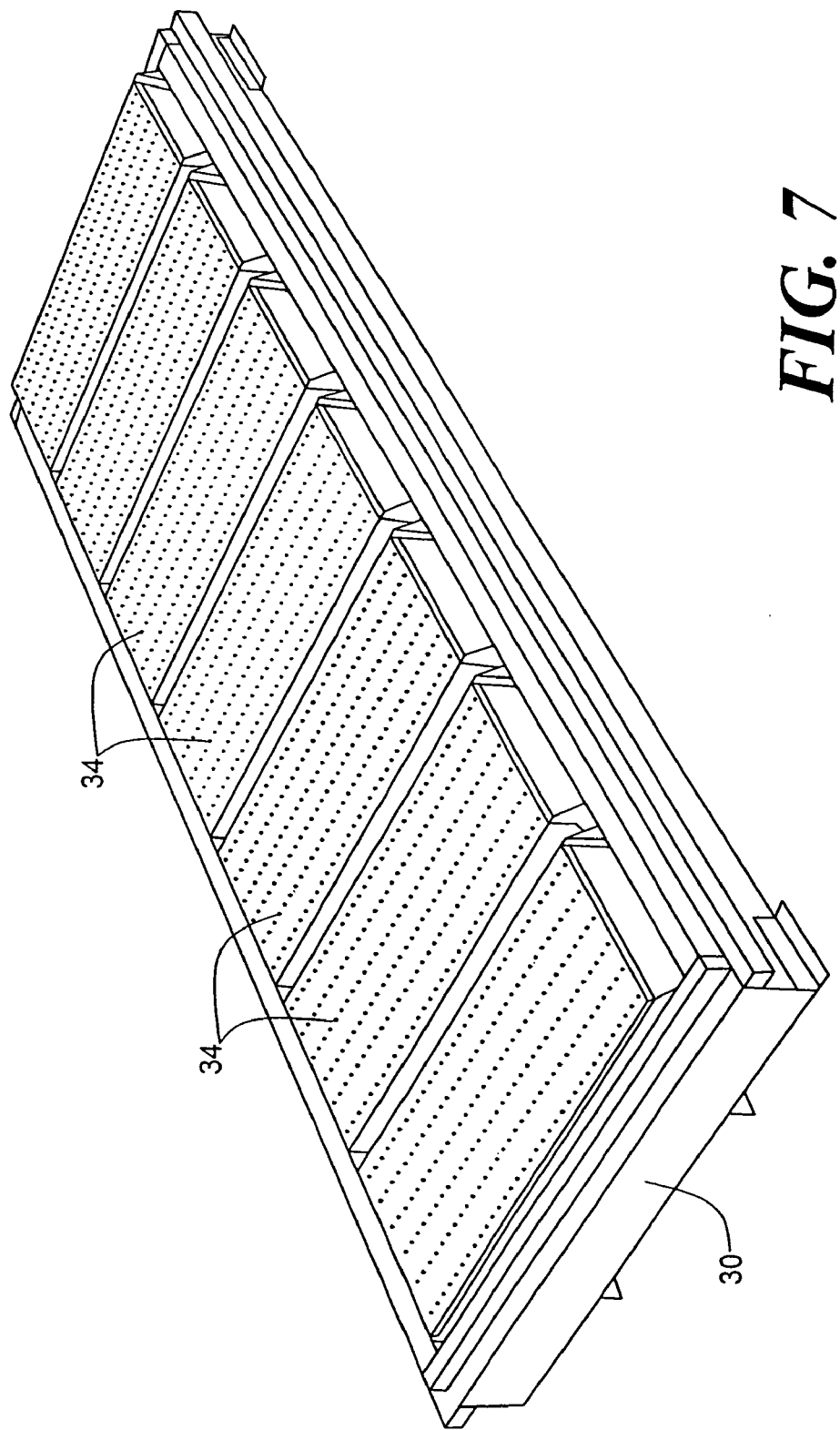
FIG. 7 is a pictorial view of a plenum box used in the multizone convection furnace.

Each of the heating assemblies are preferably of modular construction so that they can be easily removable for repair or replacement. The furnace and the heating assemblies can be as described in U.S. Pat. No. 6,394,794 of the Assignee of this invention. Each heating assembly 12 includes a plenum box 30 and a blower assembly 32. The plenum box is shown in FIG. 7. The box includes one or more orifice plates 34 having an array of openings through which jets of gas impinge on the product on the conveyer. An electrical heater 33 (FIG. 1) is contained within the plenum box such that gas passes over the heater to be heated to a desired temperature and then through the openings in the orifice plate for impingement onto the product. A plurality of plenum boxes are integrally mounted within the furnace case above and/or below the product depending upon the furnace configuration. In the embodiment of FIG. 1, plenum boxes are part of the upper and lower heating assemblies disposed in the heat zones of the heating chamber. A similar plenum box can be used in the cooling chamber for providing jets of cooled gas to the product on the conveyer. For use in the cooling chamber, no heater is needed.

Figure 8:
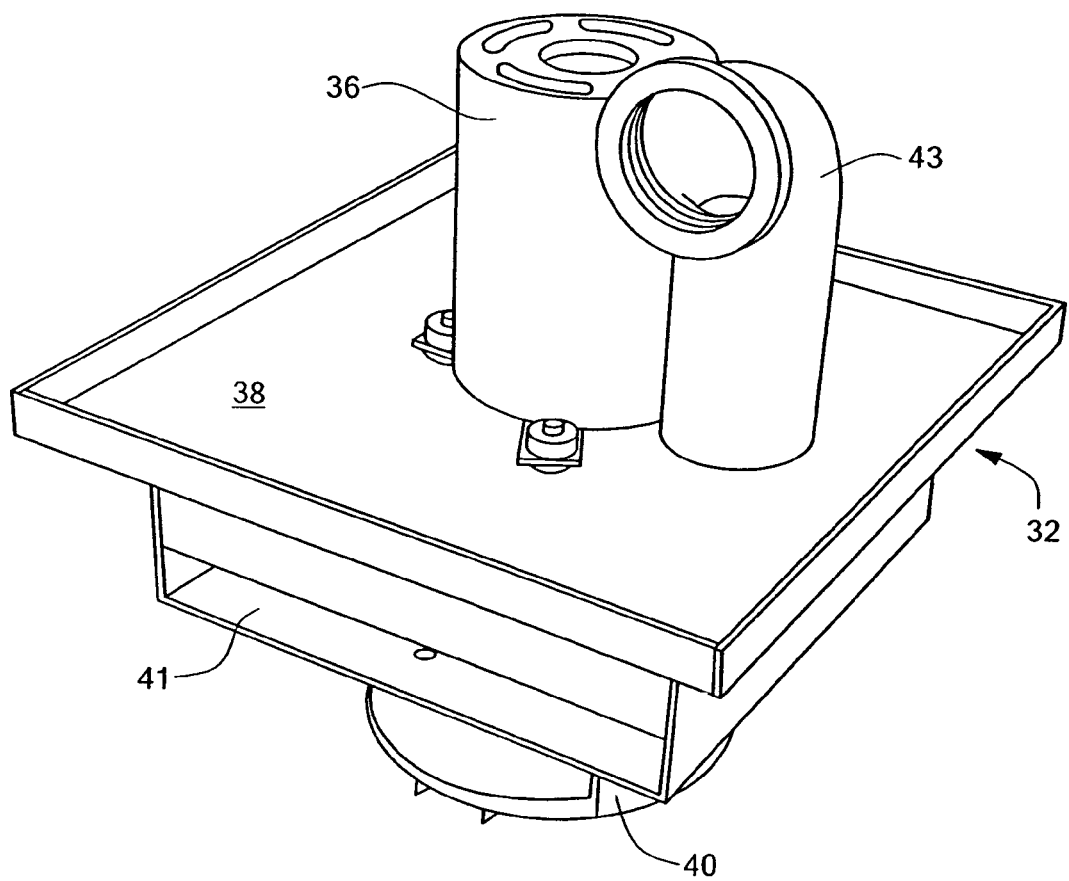
FIG. 8 is a pictorial view of a blower assembly used in the multizone convection furnace.

The blower assembly 32 is shown in FIG. 8. The blower assembly is sealed to the associated plenum box and produces high pressure within the box and low pressure outside the box to cause gas to flow through the orifice plate and to circulate within the chamber. The blower assembly is a field replaceable unit which is easy to install and remove for repair or replacement. The blower assembly contains a blower motor 36 mounted to a plate 38 and having a gasket or other seal to prevent atmospheric leakage. A fan housing 40 containing an impeller extends into the plenum box through an opening in the box, as can be seen in FIG. 3. The fan housing includes a gas intake 41 for drawing gas from the furnace chamber for recirculation through the plenum box and orifice plate onto the product. A duct 43 couples to the cooled gas piping 20 for introduction of cooled gas into the plenum box for mixing with the heated gas therein. A gasket or other seal between the blower assembly and the plenum box is provided to provide a gas tight seal between the plenum box and blower assembly. Details of the construction and operation of the blower assembly are described in the aforesaid U.S. Pat. No. 6,394,794.

The draw of the plenum box of the heating assemblies in the applicable heat zones causes movement of the cooling gas from the cooling chamber to the selected heat zones. If additional gas propulsion is needed a blower can be provided in the cooling gas path, as illustrated for example by blower 21 in FIG. 5.

The convection furnace will typically include features which themselves are known in the art such as entrance and exit vestibules, flux collection apparatus and controllers for temperature and gas.

The invention is not to be limited by what has been particularly shown and described and is intended to encompass the spirit and full scope of the appended claims.

What is claimed is:
1. A convection furnace comprising:
 a heating chamber having a plurality of heat zones, each of the heat zones having at least one heating assembly for providing heated gas to a product conveyed through the furnace, each of the heating assemblies including an electrical heater within a plenum box having an orifice plate containing an array of openings from which jets of heated gas impinge on the product;
 a controller in communication with the heating chamber and coupled to the heating assemblies to control the heating assemblies to provide a thermal profile along the heat zones of the furnace, the thermal profile comprising a preheat interval, a soak cycle, and a spike cycle;
 a cooling chamber at the exit end of the heating chamber having at least one cooling assembly including a plenum box for providing jets of cooled gas to a product conveyed through the cooling chamber;
 a conveyor comprising a movable support surface extending through the heating chamber and the cooling chamber of the furnace for conveying a product through the heating chamber and the cooling chamber of the furnace;
 a gas path from the cooling chamber to at least one of the heat zones of the furnace chamber, the gas path comprising a conduit, the conduit including an entrance opening and at least one exit opening, the conduit connected to the cooling chamber at a location to introduce cooled gas provided by the cooling assembly into the conduit through the entrance opening, the entrance opening of the conduit spaced a distance away from the heat zones, and the conduit connected to at least one plenum box in the heating chamber at the at least one exit opening to introduce cooled gas in the conduit provided by the cooling assembly in the cooling chamber into the at least one of the heat zones of the heating chamber in addition to and to mix with the heated gas in the at least one plenum box provided by the heating assembly within the heat zone; and
 means for controlling the volume of cooled gas flowing in the gas path from the cooling chamber to the at least one of the heat zones to provide an intended temperature in the at least one of the heat zones below a temperature provided by the heating assembly.

2. The convection furnace of claim 1 wherein the gas path is coupled from the cooling chamber to a plurality of the heat zones of the furnace chamber.

3. The convection furnace of claim 2 wherein the means for controlling the volume of cooled gas comprises, in each gas path to the plurality of heat zones, a valve having an open position to allow introduction of cooled gas into the associated heat zone and a closed position to inhibit the introduction of cooled gas into the associated heat zone.

4. The convection furnace of claim 1 wherein the gas path is coupled from the cooling chamber to all of the heat zones of the furnace chamber, and wherein the means for controlling the volume of cooled gas comprises valve apparatus in the gas path operative to selectively introduce cooled gas into one or more of the heat zones.

5. The convection furnace of claim 1 wherein each of the heating assemblies further includes a blower assembly for producing high pressure within the plenum box to cause heated gas to flow through the orifice plate.

6. The convection furnace of claim 1, wherein each of the plenum boxes is of modular construction to be mounted adjacent like orifice boxes across the length of the heating chamber.

7. The convection furnace of claim 6 wherein each of the blower assemblies are modular and removably mounted to a respective plenum box.

8. The convection furnace of claim 1 wherein the plurality of heat zones each includes a heating assembly above and below the conveyor.

9. The convection furnace of claim 1 wherein the means for controlling the volume of cooled gas comprises the size of the gas path.

10. The convection furnace of claim 1 wherein the means for controlling the volume of cooled gas comprises valve apparatus in the gas path.

11. The convection furnace of claim 1 including a blower in the gas path and operative to move cooled gas from the cooling chamber into the at least one of the heat zones of the heating chamber.

12. The convection furnace of claim 1 wherein the cooled gas is moved from the cooling chamber into the at least one of the heat zones of the heating chamber by a draw from the at least one heating assembly.

13. A convection furnace comprising:
a heating chamber having a plurality of heat zones, each of the heat zones having at least one heating assembly for providing heated gas to a product conveyed through the furnace, each of the heating assemblies including an electrical heater within a plenum box having an orifice plate containing an array of openings from which jets of heated gas impinge on the product;
a controller in communication with the heating chamber and coupled to the heating assemblies to control the heating assemblies to provide a thermal profile along the heat zones of the furnace, the thermal profile comprising a preheat interval, a soak cycle, and a spike cycle;
a cooling chamber at the exit end of the heating chamber having at least one cooling assembly for providing cooled gas to a product conveyed through the cooling chamber, the cooling chamber including a source of cooled gas;
a conveyor comprising a movable support surface extending through the heating chamber and the cooling chamber of the furnace for conveying the product through the heating chamber and the cooling chamber of the furnace; and
the cooling chamber coupled to one or more of the heating assemblies by a gas path through which cooled gas is selectively introduced from the cooling chamber into one or more of the heat zones, in addition to the heated gas provided by the heating assembly within the heat zone for mixing with the heated gas, at a volume to provide an intended temperature in the one or more heat zones below a temperature provided by the heating assembly, the gas path comprising a conduit, the conduit including an entrance opening and at least one exit opening, the conduit connected to the cooling chamber at a location to introduce cooled gas provided by the cooling assembly into the conduit through the entrance opening, the entrance opening spaced a distance away from the heat zones, and the conduit connected to at least one plenum box in the heating chamber at the at least one exit opening to introduce cooled gas in the conduit into the at least one of the heat zones of the heating chamber in addition to and to mix with the heated gas in the at least one plenum box.

14. The convection furnace of claim 13 wherein the cooled gas is moved from the cooling chamber into the one or more of the heat zones of the heating chamber by a draw from the heating assemblies.

15. The convection furnace of claim 13 wherein the cooling chamber is coupled to the heating assemblies of a plurality of the heat zones.

16. The convection furnace of claim 15 wherein the gas path from the cooling chamber to the heat zones includes valve apparatus for controlling the flow of cooled gas into the heat zones.

17. The convection furnace of claim 16 wherein the valve apparatus includes a control valve in the gas path operative to control the flow into all of the heat zones receiving cooled gas.

18. The convection furnace of claim 16 wherein the valve apparatus includes a control valve in the gas path to each of the heat zones receiving cooled gas for control of the flow of cooled gas therein.

* * * * *